(12) United States Patent
Chang (10) Patent No.: US 11,643,507 B2
(45) Date of Patent: *May 9, 2023

(54) PREPOLYMERIZED RESIN, PREPARATION METHOD THEREOF, RESIN COMPOSITION COMPRISING THE SAME, AND ARTICLE MADE THEREFROM

(71) Applicant: Elite Material Co., Ltd., Taoyuan (TW)

(72) Inventor: Shu-Hao Chang, Taoyuan (TW)

(73) Assignee: ELITE MATERIAL CO., LTD., Taoyuan (TW)

( * ) Notice: Subject to any disclaimer, the term of this patent is extended or adjusted under 35 U.S.C. 154(b) by 234 days.

This patent is subject to a terminal disclaimer.

(21) Appl. No.: 17/093,914

(22) Filed: Nov. 10, 2020

(65) Prior Publication Data

US 2021/0054151 A1  Feb. 25, 2021

Related U.S. Application Data

(63) Continuation of application No. 15/985,445, filed on May 21, 2018, now Pat. No. 10,894,865.

(30) Foreign Application Priority Data

Mar. 26, 2018 (TW) ................. 107110250

(51) Int. Cl.
| | |
|---|---|
| *C08F 12/34* | (2006.01) |
| *C08F 2/40* | (2006.01) |
| *C08F 236/06* | (2006.01) |
| *C08G 81/02* | (2006.01) |
| *C08K 5/00* | (2006.01) |

(52) U.S. Cl.
CPC .............. *C08G 81/022* (2013.01); *C08F 2/40* (2013.01); *C08F 12/34* (2013.01); *C08F 236/06* (2013.01); *C08K 5/0025* (2013.01); *C08K 5/0066* (2013.01)

(58) Field of Classification Search
CPC .......... C08F 2/40; C08F 12/34; C08F 236/06; C08K 5/0025; C08K 5/0066; C08G 81/00; C08G 81/02; C08G 81/021
See application file for complete search history.

(56) References Cited

U.S. PATENT DOCUMENTS

| | | | |
|---|---|---|---|
| 3,392,202 A | 7/1968 | Pritchett | |
| 4,588,782 A | 5/1986 | Ono et al. | |
| 10,894,865 B2 * | 1/2021 | Chang | ................. C08K 5/0066 |
| 2015/0104663 A1 | 4/2015 | De Jong et al. | |
| 2016/0333122 A1 | 11/2016 | Huizen et al. | |

* cited by examiner

*Primary Examiner* — Irina S Zemel
*Assistant Examiner* — Jeffrey S Lenihan
(74) *Attorney, Agent, or Firm* — Muncy, Geissler, Olds & Lowe, P.C.

(57) ABSTRACT

A prepolymerized resin prepared by subjecting a composition to a pre-reaction in the presence of a polymerization inhibitor. The composition at least includes bis(vinylphenyl) ethane and polybutadiene. The polybutadiene has a 1,2-vinyl content of 85% or above and a number average molecular weight of less than 3000, wherein the pre-reaction has a conversion rate of between 30% and 90%. During the pre-reaction, components in the composition are partially crosslinked to leave residual vinyl groups. The composition further includes vinyl-containing polyphenylene ether and has a number average molecular weight of between 4,000 and 12,000.

2 Claims, 3 Drawing Sheets

PREPOLYMERIZED RESIN, PREPARATION METHOD THEREOF, RESIN COMPOSITION COMPRISING THE SAME, AND ARTICLE MADE THEREFROM

CROSS-REFERENCE TO RELATED APPLICATION

This application is a Continuation of co-pending application Ser. No. 15/985,445 filed on May 21, 2018, for which priority is claimed under 35 U.S.C. § 120; and this application claims priority of Application No. 107110250, filed in Taiwan, R.O.C. on Mar. 26, 2018 under 35 U.S.C. § 119; the entire contents of all of which are hereby incorporated by reference.

BACKGROUND

1. Field of the Disclosure

Disclosed is a prepolymerized resin, a preparation method thereof, a resin composition comprising the same, and an article made therefrom.

2. Description of Related Art

Conventionally, polyphenylene ether resins are widely used for making low dielectric copper-clad laminates, but copper-clad laminates made solely from a polyphenylene ether resin has a low glass transition temperature, and copper-free laminates made therefrom have an unsatisfactory dissipation factor (DO of greater than 0.005 as measured under 10 GHz frequency, thereby failing to meet the demands of new generation high frequency and low dielectric circuit boards. While the addition of other components in polyphenylene ether resins may increase the glass transition temperature of copper-clad laminates and decrease the dissipation factor, other problems arise in the meantime. For example, after lamination, the laminates are prone to form branch-like pattern, which deteriorates the reliability of circuit boards made from the copper-clad laminates and significantly lowers the yield.

Accordingly, there is a need to develop a material for copper-clad laminates that overcomes the aforesaid drawbacks.

SUMMARY

A primary object of this disclosure is to provide a prepolymerized resin prepared by pre-reacting (i.e., via prepolymerization) a composition, the composition at least comprising bis(vinylphenyl)ethane and polybutadiene, wherein the polybutadiene has a 1,2-vinyl content of 85% or above and a number average molecular weight of less than 3000.

In one embodiment, the prepolymerized resin is prepared by pre-reacting the composition in the presence of a polymerization inhibitor.

In one embodiment, the composition further comprises vinyl-containing polyphenylene ether.

In one embodiment, the prepolymerized resin has a number average molecular weight of between 4,000 and 12,000.

In one embodiment, bis(vinylphenyl)ethane and polybutadiene are prepolymerized according to a molar ratio of 9.9:0.1 to 0.1:9.9.

Preferably, bis(vinylphenyl)ethane and polybutadiene are pre-reacted at a molar ratio of, for example, 9:1, 8:2, 7:3, 6:4, 5.5:4.5, 5:5, 4.5:5.5, 4:6, 3:7, 2:8 or 1:9, but not limited thereto. For example, the molar ratio of bis(vinylphenyl)ethane to polybutadiene may also be 2:1, 1:2, or 7.5:2.5.

According to the present disclosure, the prepolymerized resin obtained from prepolymerizing bis(vinylphenyl)ethane and polybutadiene is characterized by having a reactive vinyl group, even after the prepolymerization process. Unless otherwise specified, a vinyl or vinyl group used herein refers to a reactive vinyl group.

The bis(vinylphenyl)ethane may be 1,2-bis(4-vinylphenyl)ethane, 1,2-(3-vinylphenyl-4-vinylphenyl)ethane, 1,2-(2-vinylphenyl-4-vinylphenyl)ethane, 1,2-bis(3-vinylphenyl)ethane, 1,2-(3-vinylphenyl-2-vinylphenyl)ethane, 1,2-bis(2-vinylphenyl)ethane or a combination thereof. More preferred is 1,2-bis(4-vinylphenyl)ethane, 1,2-(3-vinylphenyl-4-vinylphenyl)ethane, 1,2-bis(3-vinylphenyl)ethane or a combination thereof.

1,2-bis(4-vinylphenyl)ethane has the structure shown below:

As used herein, unless otherwise specified, "polybutadiene" refers to a polybutadiene having a 1,2-vinyl content of 85% or above and a number average molecular weight of less than 3000, examples including but not limited to: a polybutadiene having a 1,2-vinyl content of 85% or above and a number average molecular weight of 900 to 1500; a polybutadiene having a 1,2-vinyl content of 85% or above and a number average molecular weight of 1000 to 1200; a polybutadiene having a 1,2-vinyl content of 85% or above and a number average molecular weight of about 1100; a polybutadiene having a 1,2-vinyl content of 85% or above and a number average molecular weight of 1800 to 2600; a polybutadiene having a 1,2-vinyl content of 85% or above and a number average molecular weight of 2000 to 2200; and a polybutadiene having a 1,2-vinyl content of 85% or above and a number average molecular weight of about 2100. Preferably, a polybutadiene having a 1,2-vinyl content of 85% or above and a number average molecular weight of less than 2000 is pre-reacted with bis(vinylphenyl)ethane.

Examples of polybutadiene used herein include B-1000 and B-2000 available from Nippon Soda Co., Ltd., or a combination thereof.

The polybutadiene used herein may have the structure shown below:

wherein n=15 to 25, preferably n=16 to 22.

In one embodiment, the polybutadiene has a 1,2-vinyl content (content of reactive vinyl group) of 85% or above and a 1,4-vinyl content (content of non-reactive vinyl group) of 15% or below, and the number average molecular weight is less than or equal to 2000.

More preferred is the polybutadiene having a 1,2-vinyl content of 85% or above, a 1,4-vinyl content of 15% or below and a number average molecular weight of about 1100.

The prepolymerized resin of the present disclosure is prepared by the prepolymerization of any bis(vinylphenyl)ethane as described above and any polybutadiene as described above in the presence of a polymerization inhibitor. In other words, the present disclosure further relates to a method of preparing the aforesaid prepolymerized resin, comprising: under a proper condition (e.g., in the presence of a polymerization inhibitor), subjecting a composition to a pre-reaction, the composition at least comprising bis(vinylphenyl)ethane and polybutadiene, wherein the polybutadiene has a 1,2-vinyl content of 85% or above and a number average molecular weight of less than 3000.

In the present disclosure, the use amount of polymerization inhibitor is not particularly limited; relative to a total of one mole of bis(vinylphenyl)ethane and polybutadiene, the amount of polymerization inhibitor may range from 0.001 to 0.1 mole, preferably from 0.005 to 0.05 mole.

The polymerization inhibitor may be an inhibitor for polymerization and may comprise, without limitation: hydroquinone, p-benzoquinone, phenothiazine, β-phenylnaphthylamine, 4-t-butylcatechol, methylene blue, 4,4'-butylidenebis(6-t-butyl-3-methylphenol), 2,2'-methylenebis(4-ethyl-6-t-butylphenol) or a combination thereof.

Preferred polymerization inhibitor is 4,4'-butylidenebis(6-t-butyl-3-methylphenol) or 2,2'-methylenebis(4-ethyl-6-t-butylphenol).

One of the features of the present disclosure lies in controlling the conversion rate of the pre-reaction between bis(vinylphenyl)ethane and polybutadiene under proper conditions, such as using the aforesaid polymerization inhibitor to control the conversion rate of the pre-reaction between bis(vinylphenyl)ethane and polybutadiene, such that they are partially crosslinked and that the product thus formed retains residual vinyl groups. For example, as used herein, pre-reaction may refer to a prepolymerization reaction, and the conversion rate of the pre-reaction is greater than 1% and less than 99%, preferably greater than 10% and less than 90%. For example, during the prepolymerization, the conversion rate of the pre-reaction between bis(vinylphenyl)ethane and polybutadiene may be between 30% and 90%, preferably between 50% and 80%, and more preferably between 50% and 70%. Specifically, if the conversion rate of bis(vinylphenyl)ethane and polybutadiene is 0%, there is completely no reaction or crosslinking between bis(vinylphenyl)ethane and polybutadiene, and the prepolymerized resin cannot be formed. In contrast, a 100% conversion rate of bis(vinylphenyl)ethane and polybutadiene indicates that bis(vinylphenyl)ethane and polybutadiene have been fully crosslinked, therefore also failing to form the prepolymerized resin, and the product thus obtained does not contain any reactive vinyl group.

According to the method disclosed herein for preparing a prepolymerized resin, a polymerization inhibitor is added during polymerization to effectively control the conversion rate of between 30% and 90%, preferably between 50% and 80%, and more preferably between 50% and 70%.

One the other hand, if peroxide is added during polymerization, the pre-reaction will be undesirably too fast, such that the conversion rate cannot be controlled as below 100% or even below 90% easily, making bis(vinylphenyl)ethane and polybutadiene completely crosslinked without leaving any vinyl group. The absence of residual vinyl group makes it difficult for the reaction product to crosslink with other resins, and a 100% conversion rate of bis(vinylphenyl)ethane and polybutadiene will result in an unacceptably high viscosity of the product for impregnating fiberglass fabrics.

Accordingly, in one embodiment, peroxide is not used during the pre-reaction for preparing prepolymerized resin.

The prepolymerized resin disclosed herein has a number average molecular weight of about 4000 to 12000, preferably 4000 to 10000, and more preferably 4000 to 6000.

Also disclosed herein is another prepolymerized resin, which is prepared by prepolymerizing bis(vinylphenyl)ethane, polybutadiene and vinyl-containing polyphenylene ether, characterized by the presence of reactive vinyl group after prepolymerization.

The aforesaid prepolymerized resin may also be formed in the presence of a polymerization inhibitor, wherein the type and use amount of the polymerization inhibitor are as described above.

The vinyl-containing polyphenylene ether is a vinyl-terminated polyphenylene ether, wherein the capping vinyl group is the reactive vinyl group described above. For example, unless otherwise specified, the polyphenylene ether resin used herein is not particularly limited and may comprise any one or more commercial products, products synthesized by the applicant or a combination thereof, such as but not limited to vinylbenzyl-terminated polyphenylene ether resin (e.g., OPE-2st, available from Mitsubishi Gas Chemical Co., Inc.), methacrylate-terminated polyphenylene ether resin (e.g., SA-9000, available from SABIC), vinylbenzyl-modified bisphenol A polyphenylene ether resin, vinyl-containing chain-extended polyphenylene ether resin or a combination thereof.

The vinyl-containing chain-extended polyphenylene ether resin may include various polyphenylene ether resins disclosed in the US Patent Application Publication No. 2016/0185904 A1, all of which are incorporated herein by reference in their entirety.

Also disclosed herein is a method of preparing a prepolymerized resin, comprising dissolving bis(vinylphenyl)ethane, polybutadiene and a polymerization inhibitor in a solvent, rising the reaction temperature to above room temperature, such as 30-80° C. and preferably 50-80° C., and stirring the reaction for 0.5-3 hours and preferably 1-2 hours. Next, the temperature is lowered to room temperature (about 25° C.) to obtain a solution, which is filtered to remove impurities to obtain a liquid state pre-reaction product, i.e., the prepolymerized resin formed by pre-reacting bis(vinylphenyl)ethane and polybutadiene.

Further disclosed herein is a method of preparing a prepolymerized resin, comprising dissolving bis(vinylphenyl)ethane, polybutadiene and a polymerization inhibitor in a solvent, followed by adding a vinyl-containing polyphenylene ether, wherein the reaction is stirred to dissolve the vinyl-containing polyphenylene ether if it is in a solid state. Next, the reaction temperature is increased to above room temperature, such as 30-80° C., preferably 50-80° C., and the reaction is stirred for 0.5-3 hours, preferably 1-2 hours, and then the temperature is lowered to room temperature (about 25° C.) to obtain a solution, which is filtered to remove impurities to obtain a liquid state pre-reaction product, i.e., the prepolymerized resin formed by pre-reacting vinyl-containing polyphenylene ether, bis(vinylphenyl)ethane and polybutadiene.

In one embodiment, peroxide is not used during the pre-reaction for preparing prepolymerized resin.

Also disclosed herein is a resin composition, comprising the above-described prepolymerized resin and an additive.

The additive may be, for example, selected from a group consisting of polyphenylene ether, cyanate ester, maleimide resin, polyolefin, acrylate, styrene, divinylbenzene (DVB), bis(vinylbenzyl)ether (BVBE), bis(vinylphenyl)ethane, triallyl isocyanurate (TAIC), triallyl cyanurate (TAC), 1,2,4-trivinyl cyclohexane (TVCH) or a combination thereof. Relative to 100 parts by weight of the prepolymerized resin, individual additives or their combination may be used by an amount of 1 to 200 parts by weight, preferably 5 to 100 parts by weight, more preferably 5 to 80 parts by weight, and even more preferably 15 to 60 parts by weight. A preferred additive is a vinyl-containing additive. Unless otherwise specified, a vinyl or vinyl group described herein refers to a reactive vinyl group.

Another object of the present disclosure is to provide an article made from the resin composition, such as a resin film, a prepreg, a laminate or a printed circuit board, but not limited thereto.

The article made from the resin composition may be a resin film, which is prepared by heating and baking to cure the resin composition. The resin composition may be selectively coated on a polyethylene terephthalate film (PET film), a polyimide film (PI film) or a copper foil, followed by heating and baking to semi-cure the resin composition to form the resin film.

The article made from the resin composition may be a prepreg, which comprises a reinforcement material and a layered structure disposed thereon. The layered structure is formed by heating the resin composition at a high temperature to the B-stage. Suitable baking temperature for making the prepreg may be for example 80° C. to 170° C. For example, the reinforcement material may be any one of a fiber material, woven fabric, non-woven fabric, liquid crystal resin film, polyester (PET) film and polyimide (PI) film, and the woven fabric preferably comprises fiberglass fabrics. Types of fiberglass fabrics are not particularly limited and may be any commercial fiberglass fabric useful for various printed circuit boards, such as E-glass fabric, D-glass fabric, S-glass fabric, T-glass fabric, L-glass fabric or NE-glass fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

The article made from the resin composition may be a laminate, which comprises two metal foils and an insulation layer (i.e., the layered structure) disposed between the metal foils, wherein the insulation layer is made by curing the resin composition at high temperature and high pressure to the C-stage, a suitable curing temperature being for example between 150° C. and 220° C. and preferably between 200° C. and 210° C. and a suitable curing time being 90 to 180 minutes and preferably 120 to 150 minutes. The insulation layer may be the aforesaid prepreg or resin film. The metal foil may comprise copper, aluminum, nickel, platinum, silver, gold or alloy thereof, such as a copper foil.

Preferably, the laminate is a copper-clad laminate (CCL).

The laminate may be further processed by trace formation processes to provide a circuit board.

The prepolymerized resin disclosed herein is primarily characterized by using a proper condition (e.g., presence of a polymerization inhibitor) to inhibit or control the crosslinking reaction between bis(vinylphenyl)ethane and polybutadiene and to avoid undesirably fast reaction rate, thereby controlling a proper conversion rate to form the prepolymerized resin. Several technical advantages or effects have been achieved by the prepolymerized resin prepared by using a proper condition (e.g., presence of a polymerization inhibitor) to pre-react bis(vinylphenyl)ethane and polybutadiene (having a 1,2-vinyl content of 85% or above and a number average molecular weight of less than 3000), in contrast to non-prepolymerized bis(vinylphenyl)ethane and polybutadiene, or a composition containing peroxide prior to prepolymerization, or a product made by prepolymerizing bis(vinylphenyl)ethane and styrene-butadiene copolymer, or a product made by prepolymerizing bis(vinylphenyl)ethane and an improper polybutadiene (e.g., having a 1,2-vinyl content of less than 85%, or having a 1,2-vinyl content of 85% or above and a number average molecular weight of above 3000), including:

(1) the prepolymerized resin disclosed herein has a vinyl group useful for crosslinking with other vinyl-containing resin in a resin composition;

(2) peroxide is not added during the preparation of the prepolymerized resin, thereby avoiding a 100% conversion rate of the prepolymerized resin and avoiding a viscosity of the reaction product which is too high to impregnate fiberglass fabrics; and (3) the copper-clad laminate made from the prepolymerized resin disclosed herein has better dissipation factor, copper foil peel strength, and interlayer bonding strength, and after lamination, the laminate is free from branch-like patterns.

DETAILED DESCRIPTION OF EMBODIMENTS

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or similar expression is employed to describe elements and features of the present disclosure. This is done merely for convenience and to give a general sense of the scope of the present disclosure. Accordingly, this description should be read to include one or at least one and the singular also includes the plural unless it is obvious to mean otherwise.

As used herein, the term "comprises," "comprising," "includes," "including," "has," "having" or any other variant thereof is construed as an open-ended transitional phrase intended to cover a non-exclusive inclusion. For example, a composition or article of manufacture that comprises a list of elements is not necessarily limited to only those elements but may include other elements not expressly listed or inherent to such composition or article of manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "comprises," "comprising," "includes," "including," "has," "having" or any other variant thereof, it is understood that transitional phrases such as "consisting essentially of" and "consisting of" are also disclosed and included.

In this disclosure, features such as values, numbers, contents, amounts or concentrations presented as a numerical range or a percentage range are merely for convenience and brevity. Therefore, a numerical range or a percentage range should be interpreted as encompassing and specifically disclosing all possible subranges and individual numerals or values therein, particularly all integers therein. For example, a range of "1 to 8" or "between 1 and 8" should be understood as explicitly disclosing all subranges such as 1 to 7, 2 to 8, 2 to 6, 3 to 6, 4 to 8, 3 to 8 and so on, particularly all subranges defined by integers, as well as disclosing individual values such as 1, 2, 3, 4, 5, 6, 7 and 8. Unless otherwise defined, the aforesaid interpretation rule should be applied throughout the present disclosure regardless broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of $X_1$, $X_2$ and $X_3$," it is intended to disclose the situations of X is $X_1$ and X is $X_1$ and/or $X_2$. In addition, when a Markush group or a list of items is used to describe examples or embodiments of the present disclosure, a skilled artisan will understand that any subgroup or any combination of the members or items in the Markush group or list may also be used to describe the present disclosure. Therefore, when X is described as being "selected from a group consisting of $X_1$, $X_2$ and $X_3$" and Y is described as being "selected from a group consisting of $Y_1$, $Y_2$ and $Y_3$," the disclosure encompasses any combination of X is $X_1$ and/or $X_2$ and/or $X_3$ and Y is $Y_1$ and/or $Y_2$ and/or $Y_3$.

Examples and embodiments are described in detail below. It will be understood that these examples and embodiments are exemplary only and are not intended to limit the scope of the present disclosure. Unless otherwise specified, processes, reagents and conditions described in the examples are those known in the art.

Disclosed herein is a prepolymerized resin prepared by pre-reacting a composition, the composition at least comprising bis(vinylphenyl)ethane and polybutadiene, wherein the polybutadiene has a 1,2-vinyl content of 85% or above and a number average molecular weight of less than 3000. In one embodiment, the composition further comprises vinyl-containing polyphenylene ether.

Also disclosed is a method of preparing the prepolymerized resin, in which the composition is subject to prepolymerization under proper conditions so that the product thus prepared contains residual reactive vinyl group.

Also disclosed herein is a resin composition, comprising the above-described prepolymerized resin and an additive.

Also disclosed herein is an article made from the resin composition, comprising a resin film, a prepreg, a laminate or a printed circuit board.

The resin composition disclosed herein comprises the aforesaid prepolymerized resin and an additive, wherein the additive is selected from a group consisting of polyphenylene ether, cyanate ester, maleimide resin, polyolefin, acrylate, styrene, divinylbenzene, bis(vinylbenzyl)ether, bis(vinylphenyl)ethane, triallyl isocyanurate, triallyl cyanurate, 1,2,4-trivinyl cyclohexane or a combination thereof.

Additives suitable for the resin composition disclosed herein are described briefly below.

The polyphenylene ether may comprise a vinyl-containing polyphenylene ether or a hydroxyl-containing polyphenylene ether. For example, unless otherwise specified, the polyphenylene ether used in the present disclosure is not particularly limited and may be any commercial product, product synthesized by the applicant or a combination thereof. Examples include, but not limited to, dihydroxyl-terminated polyphenylene ether resin (e.g., SA-90 available from SABIC), vinylbenzyl-terminated polyphenylene ether resin (e.g., OPE-2st available from Mitsubishi Gas Chemical Co., Inc.), methacrylate-terminated polyphenylene ether resin (e.g., SA-9000 available from SABIC), vinylbenzyl-modified bisphenol A polyphenylene ether resin, vinyl-containing chain-extended polyphenylene ether resin or a combination thereof. A preferred polyphenylene ether is the vinyl-containing polyphenylene ether.

The cyanate ester may include any one or more cyanate ester resins useful for preparing a prepreg, a resin film, a laminate or a printed circuit board, such as a compound having an Ar—O—C≡N structure, wherein Ar may be a substituted or unsubstituted aromatic group. Examples include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin or fluorene cyanate ester resin. The novolac cyanate ester resin may be bisphenol A novolac cyanate ester resin, bisphenol F novolac cyanate ester resin or a combination thereof. For example, the cyanate ester resin may be available under the tradename Primaset PT-15, PT-30S, PT-60S, CT-90, BADCY, BA-100-10T, BA-200, BA-230S, BA-300S, BTP-2500, BTP-6020S, DT-4000, DT-7000, Methylcy, and ME-240S sold by Lonza.

The maleimide resin refers to a compound, monomer, mixture, oligomer or polymer containing at least one maleimide group. Unless otherwise specified, the maleimide resin used in the present disclosure is not particularly limited and may include any one or more maleimide resins useful for preparing a prepreg, a resin film, a laminate or a printed circuit board. Examples include but are not limited to 4,4'-diphenylmethane bismaleimide, oligomer of phenylmethane maleimide (a.k.a. polyphenylmethane maleimide), m-phenylene bismaleimide, bisphenol A diphenyl ether bismaleimide, 3,3'-dimethyl-5,5'-diethyl-4,4'-diphenylmethane bismaleimide, 4-methyl-1,3-phenylene bismaleimide, 1,6-bismaleimide-(2,2,4-trimethyl hexane), N-2,3-xylylmaleimide, N-2,6-xylenemaleimide, N-phenylmaleimide, maleimide compound containing aliphatic long chain structure, prepolymer thereof and a combination thereof. The aforesaid prepolymer may for example be a prepolymer of diallyl compound and maleimide compound, a prepolymer of diamine and maleimide compound, a prepolymer of multifunctional amine and maleimide compound or a prepolymer of acid phenol compound and maleimide compound.

For example, the maleimide resin may include products such as BMI-70, BMI-80, BMI-1000, BMI-1000H, BMI-1100, BMI-1100H, BMI-2000, BMI-2300, BMI-3000, BMI-3000H, BMI-4000H, BMI-5000, BMI-5100, BMI-7000 and BMI-7000H sold by Daiwa Kasei Co., Ltd.

For example, the maleimide resin containing aliphatic long chain structure may include products such as BMI-689, BMI-1400, BMI-1500, BMI-1700, BMI-2500, BMI-3000, BMI-5000 and BMI-6000 sold by Designer Molecules Inc.

In one embodiment, the content of maleimide resin is 10 to 80 and preferably 20 to 70 parts by weight relative to 100 parts by weight of the prepolymerized resin.

The acrylate may include, but not limited to, tricyclodecane di(meth)acrylate, tri(meth)acrylate, 1,1'-[(octahydro-4,7-methano-1H-indene-5,6-diyl)bis(methylene)] ester (e.g., SR833S, available from Cray Valley) or a combination thereof.

Examples of polyolefin include but are not limited to styrene-butadiene-divinylbenzene terpolymer, styrene-butadiene-maleic anhydride terpolymer, vinyl-polybutadiene-urethane oligomer, styrene butadiene copolymer, hydrogenated styrene butadiene copolymer, styrene isoprene copolymer, hydrogenated styrene isoprene copolymer, hydrogenated styrene-butadiene-divinylbenzene copolymer, polybutadiene (homopolymer of butadiene), maleic anhydride-styrene-butadiene copolymer, methyl styrene copolymer or a combination thereof.

In addition to the aforesaid components, the resin composition may further comprise epoxy resin, phenolic resin, benzoxazine resin, styrene maleic anhydride, acrylic acid, polyester, amine curing agent, diallyl bisphenol A, polyamide, polyimide or a combination thereof.

The resin composition may further comprise flame retardant, inorganic filler, curing accelerator, solvent, toughening agent, silane coupling agent or a combination thereof.

The flame retardant used herein may be any one or more flame retardants useful for preparing a prepreg, a resin film, a laminate or a printed circuit board; examples of flame retardant include but are not limited to phosphorus-containing flame retardant, which comprises ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201, and PX-202), phosphazene (such as commercially available SPB-100, SPH-100, and SPV-100), melamine polyphosphate, DOPO and its derivatives or resins, DPPO (diphenylphosphine oxide) and its derivatives or resins, melamine cyanurate, tri-hydroxy ethyl isocyanurate, aluminium phosphinate (e.g., commercially available OP-930 and OP-935) or a combination thereof.

For example, the flame retardant may be a DPPO compound (e.g., bis-DPPO compound), a DOPO compound (e.g., bis-DOPO compound), a DOPO resin (e.g., DOPO-HQ, DOPO-NQ, DOPO-PN, and DOPO-BPN) and a DOPO-containing epoxy resin, wherein DOPO-PN is a DOPO phenol novolac compound, and DOPO-BPN may be a bisphenol novolac compound, such as DOPO-BPAN (DOPO-bisphenol A novolac), DOPO-BPFN (DOPO-bisphenol F novolac) and DOPO-BPSN (DOPO-bisphenol S novolac).

For example, relative to a total of 100 parts by weight of the prepolymerized resin and the additive, the amount of flame retardant used in the present disclosure is not particularly limited, and may range from 1 to 100 parts by weight, such as 10 to 90 parts by weight, 20 to 80 parts by weight, 30 to 70 parts by weight, or 40 to 60 parts by weight.

The inorganic filler may be any one or more inorganic fillers useful for preparing a prepreg, a resin film, a laminate or a printed circuit board; examples of inorganic filler include but are not limited to silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, zinc oxide, zirconium oxide, mica, boehmite (AlOOH), calcined talc, talc, silicon nitride and calcined kaolin. Moreover, the inorganic filler can be spherical, fibrous, plate-like, particulate, sheet-like or whisker-like in shape and can be optionally pretreated by a silane coupling agent.

For example, the curing accelerator (including curing initiator) may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butylperoxy)-3-hexyne (25B), bis(tert-butylperoxyisopropyl)benzene or a combination thereof.

The purpose of adding solvent is to change the solid content of the resin composition and to adjust the viscosity of the resin composition. For example, the solvent may comprise, but not limited to, methanol, ethanol, ethylene glycol monomethyl ether, acetone, butanone (methyl ethyl ketone), methyl isobutyl ketone, cyclohexanone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

Silane coupling agent may comprise silane (such as but not limited to siloxane) and may be further categorized according to the functional groups into amino silane, epoxide silane, vinyl silane, acrylate silane, methacrylate silane, hydroxyl silane, isocyanate silane, methacryloxy silane and acryloxy silane.

The purpose of adding toughening agent is to improve the toughness of the resin composition. The toughening agent may comprise, but not limited to, rubber resin, carboxyl-terminated butadiene acrylonitrile rubber (CTBN rubber), core-shell rubber, or a combination thereof.

The names of chemicals used in the examples and comparative examples are as follows.

H1: SA-9000, methacrylate-terminated polyphenylene ether resin, available from SABIC;

H2: OPE-2st 2200, vinylbenzyl-terminated polyphenylene ether resin, available from Mitsubishi Gas Chemical Co., Inc.;

H3: Topas COC 5013, cycloolefin copolymer not containing a reactive functional group, available from Topas Advanced Polymers;

H4: 1,2-bis(4-vinylphenyl)ethane, available from Linchuan Chemical Co., Ltd.;

H5: B-1000, polybutadiene with a 1,2-vinyl content of 85% or above and a number average molecular weight Mn of about 2000 or less, available from Nippon Soda Co., Ltd.;

H6: Ricon 150, polybutadiene with a 1,2-vinyl content of 70% and a number average molecular weight Mn of about 3900;

H8: dicumyl peroxide, available from NOF Corporation;

H9: SC-2500 SVJ, spherical silica, available from Admatechs; and

H10: commercially available toluene.

Preparation Example 1

0.2 mole of polybutadiene (having a 1,2-vinyl content of 85% or above and a number average molecular weight of less than 2000), 0.1 mole of 1,2-bis(4-vinylphenyl)ethane and 1000 mL of toluene were added to a reactor. The reaction temperature was increased to 60° C., and the reaction was stirred to dissolve starting materials into toluene. Then 0.005 mole of 2,2'-methylenebis(4-ethyl-6-t-butylphenol) was added, followed by stirring at 60° C. for 1 hour. The temperature was lowered to room temperature (about 25° C.), and the solution was filtered to remove impurities to obtain a solution of prepolymerized resin A, which is the prepolymerized resin according to the present disclosure.

Figure 1:
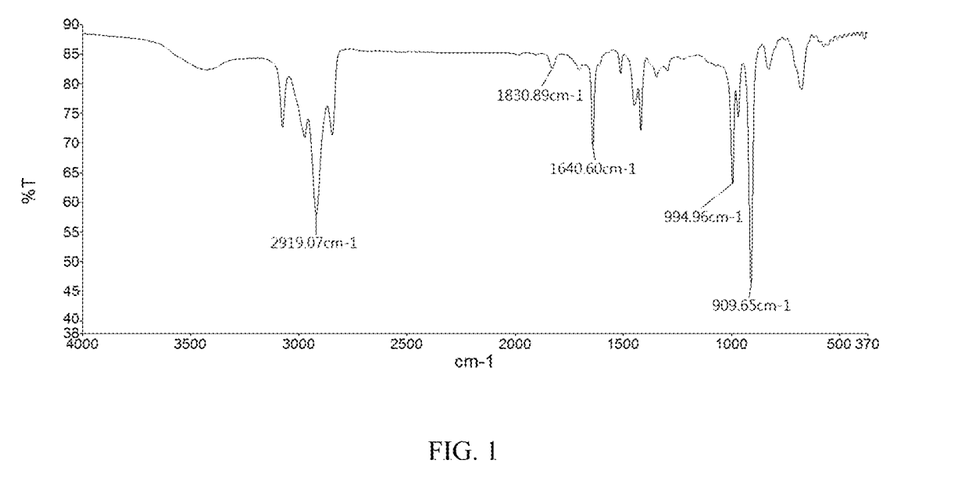
FIG. 1 illustrates the FTIR spectrum of prepolymerized resin A according to the Preparation Example 1.

The prepolymerized resin A (prepolymer A) was analyzed by using Fourier transform infrared spectroscopy (FTIR), with the result shown in FIG. 1. In FIG. 1, 1418, 1449, and 1512 cm$^{-1}$ are absorptions of benzene ring, and 1640 cm$^{-1}$ is the absorption of C═C stretch of residual side chain 1,2-vinyl group in the polybutadiene after pre-reaction.

Figure 2:
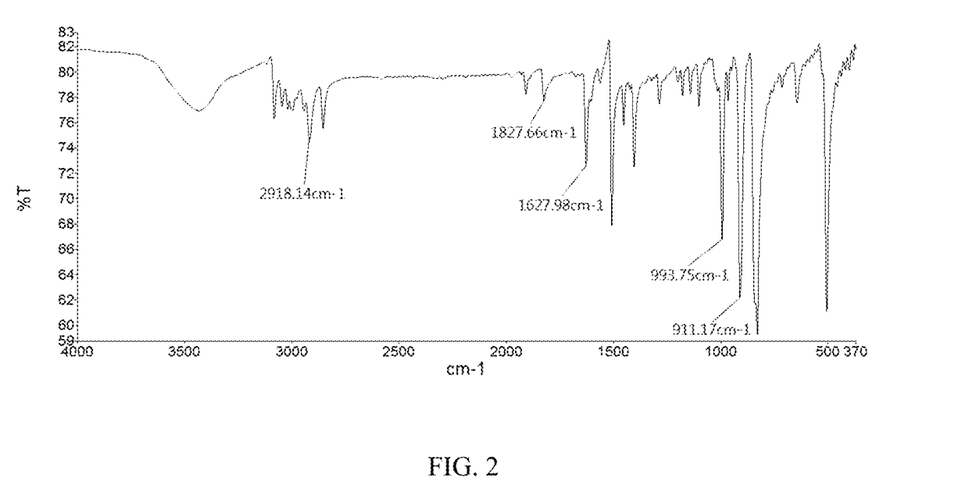
FIG. 2 illustrates the FTIR spectrum of 1,2-bis(4-vinylphenyl)ethane.

FIG. 2 illustrates the FTIR spectrum of 1,2-bis(4-vinylphenyl)ethane. In FIG. 2, 1628 cm$^{-1}$ represents the absorption of C═C stretch of terminal vinyl group on benzene ring, and 1403, 1452, 1508 cm$^{-1}$ are absorptions of benzene ring.

Figure 3:
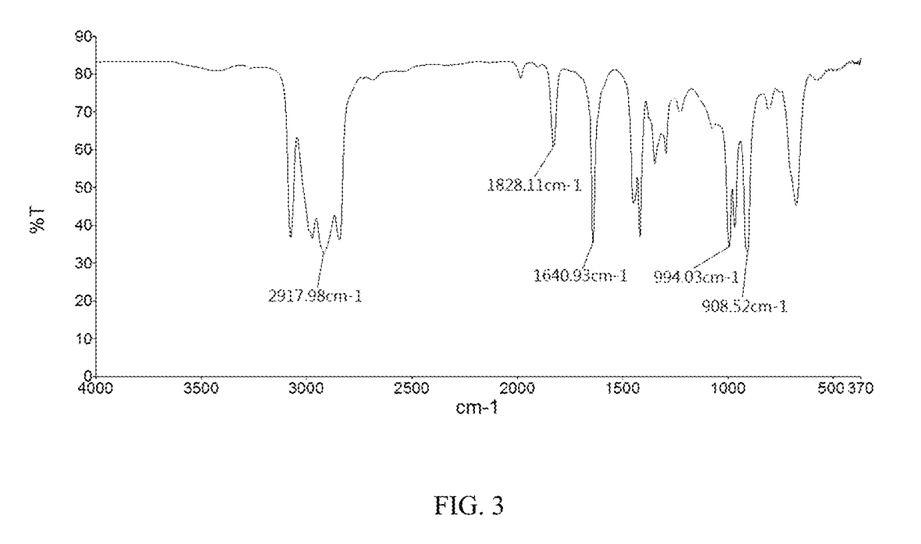
FIG. 3 illustrates the FTIR spectrum of polybutadiene (having a 1,2-vinyl content of 85% or above and a number average molecular weight of less than 2000).

FIG. 3 illustrates the FTIR spectrum of polybutadiene (having a 1,2-vinyl content of 85% or above and a number average molecular weight of less than 2000). In FIG. 3, 1640 cm$^{-1}$ represents the absorption of C═C stretch of side chain 1,2-vinyl group.

Comparison of FIG. 1 through FIG. 3 indicates that the absorption intensity of the C═C stretch of terminal vinyl group on benzene ring of 1,2-bis(4-vinylphenyl)ethane and the absorption intensity of C═C stretch of side chain 1,2-vinyl group of polybutadiene are both significantly reduced, showing that in Preparation Example 1, vinyl groups in 1,2-bis(4-vinylphenyl)ethane and polybutadiene were partially crosslinked to form the prepolymerized resin A.

Preparation Example 2

The operation was substantially the same as Preparation Example 1, except that 2,2'-methylenebis(4-ethyl-6-t-butylphenol) was replaced by hydroquinone, and a solution of prepolymerized resin B was obtained, which is the prepolymerized resin according to the present disclosure.

Preparation Example 3

The operation was substantially the same as Preparation Example 1, except that the reaction temperature was increased to 70° C., under which the reaction was stirred for 40 minutes, and a solution of prepolymerized resin C was obtained, which is the prepolymerized resin according to the present disclosure.

Preparation Example 4

The operation was substantially the same as Preparation Example 1, except that no polymerization inhibitor was added, and a solution of prepolymerized resin D was obtained.

Preparation Example 5

The operation was substantially the same as Preparation Example 1, except that the same amount of dicumyl peroxide was used in place of 2,2'-methylenebis(4-ethyl-6-t-butylphenol), and a solution of prepolymerized resin E was obtained.

Preparation Example 6

The operation was substantially the same as Preparation Example 1, except that 0.1 mole of polybutadiene (having a 1,2-vinyl content of 85% or above and a number average molecular weight of less than 2000), 0.2 mole of 1,2-bis(4-vinylphenyl)ethane, 1 mole of vinylbenzyl-terminated polyphenylene ether (OPE-2st 2200) and 1000 mL of toluene were added to the reactor, and a solution of prepolymerized resin F-1 was obtained, which is the prepolymerized resin according to the present disclosure.

Preparation Example 7

The operation was substantially the same as Preparation Example 6, except that vinylbenzyl-terminated polyphenylene ether (OPE-2st) was replaced by the same amount of methacrylate-terminated polyphenylene ether (SA-9000), and a solution of prepolymerized resin F-2 was obtained, which is the prepolymerized resin according to the present disclosure.

Preparation Example 8

The operation was substantially the same as Preparation Example 1, except that 0.1 mole of polybutadiene (having a 1,2-vinyl content of 85% or above and a number average molecular weight of less than 2000) was used, and a solution of prepolymerized resin G-1 was obtained, which is the prepolymerized resin according to the present disclosure.

Preparation Example 9

The operation was substantially the same as Preparation Example 1, except that 0.1 mole of polybutadiene (having a 1,2-vinyl content of 85% or above and a number average molecular weight of less than 2000) and 0.2 mole of 1,2-bis(4-vinylphenyl)ethane were pre-reacted, and a solution of prepolymerized resin G-2 was obtained, which is the prepolymerized resin according to the present disclosure.

Preparation Example 10

The operation was substantially the same as Preparation Example 9, except that the polybutadiene (having a 1,2-vinyl content of 85% or above and a number average molecular weight of less than 2000) was replaced by another polybutadiene (Ricon 150, having a 1,2-vinyl content of 70% and a number average molecular weight of about 3900), and a solution of prepolymerized resin G-3 was obtained.

Preparation Example 11

The operation was substantially the same as Preparation Example 10, except that the polybutadiene (having a 1,2-vinyl content of 85% or above and a number average molecular weight of less than 2000) was replaced by butadiene styrene copolymer (Ricon 100, having a 1,2-vinyl content of 70% and a number average molecular weight of about 4500), and a solution of prepolymerized resin G-4 was obtained.

The differences of prepolymerized resin A, prepolymerized resin D and prepolymerized resin E can be observed below.

| Prepolymerized Resin | Conversion Rate | Resin Viscosity | Result of Fiberglass Fabric Impregnation |
|---|---|---|---|
| A | under control | acceptable | flat and smooth |
| E | above 95% | high | unable to impregnate |
| D | above 70% and high variation between batches | high viscosity and high variation between batches | not flat and smooth, and branch-like pattern formed |

Results of Examples and Comparative Examples are listed in Table 1 to Table 2 below, in which the amount of each component is expressed as part by weight.

Resin compositions from different Examples (E1 to E10) and Comparative Examples (C1 to C6) listed in Table 1 and Table 2 were respectively added to a stirred tank, well mixed and fully dissolved as varnishes and then added to an impregnation tank. A fiberglass fabric (e.g., 2116 or 1080 E-glass fiber fabric) was passed through the impregnation tank to adhere the resin composition on the fiberglass fabric, followed by heating at 120° C. to 170° C. to the semi-cured state (B-Stage) to obtain the prepreg.

Test samples or specimens were prepared as follows.

1. Copper-Clad Laminate (Obtained by Laminating Five Prepregs)

Two 18 μm hyper very low profile (HVLP) copper foils and five prepregs made from each resin composition (using 2116 E-glass fiber fabrics) were prepared. Each prepreg has a resin content of about 55%. A copper foil, five prepregs and a copper foil were superimposed in such order and then subject to a vacuum condition for lamination at 195° C. for 2 hours to form each copper-clad laminate sample. Insulation layers were formed by curing (C-stage) five sheets of superimposed prepreg between the two copper foils, and the resin content of the insulation layers is about 55%.

2. Copper-Free Laminate (Obtained by Laminating Five Prepregs)

Each copper-clad laminate was etched to remove the two copper foils to obtain a copper-free laminate made from laminating five prepregs and having a resin content of about 55%.

3. Copper-Free Laminate (Obtained by Laminating Two Prepregs)

Two 18 μm hyper very low profile (HVLP) copper foils and two prepregs made from each resin composition (using 1080 E-glass fiber fabrics) were prepared. Each prepreg has a resin content of about 70%. A copper foil, two prepregs and a copper foil were superimposed in such order and then subject to a vacuum condition for lamination at 195° C. for 2 hours to form each copper-clad laminate sample. Next, each copper-clad laminate was etched to remove the two copper foils to obtain a copper-free laminate made from laminating two prepregs and having a resin content of about 70%.

Test items and test methods are described below.

1. Glass Transition Temperature (Tg)

The copper-free laminate (obtained by laminating five prepregs) sample was subject to glass transition temperature measurement. The glass transition temperature of each sample was measured using dynamic mechanical analysis (DMA) method by reference to IPC-TM-650 2.4.24.4, and higher glass transition temperature (° C.) is better.

2. Dissipation Factor (Df)

The copper-free laminate (obtained by laminating two prepregs) sample was subject to dissipation factor measurement. Each sample was measured by using a microwave dielectrometer (available from AET Corp.) by reference to JIS C2565 at room temperature (about 25° C.) and under 10 GHz frequency. Lower dissipation factor represents better dielectric properties of the sample. Under a 10 GHz frequency, for a Df value of less than 0.005, a difference in Df of less than 0.0001 represents no substantial difference in dissipation factor in different laminates, and a difference in Df value of greater than 0.0001 represents a significant difference (i.e., significant technical difficulty) in dissipation factor in different laminates.

3. Copper Foil Peeling Strength (P/S)

The copper-clad laminate (obtained by laminating five prepregs) was cut into a rectangular specimen with a width of 24 mm and a length of greater than 60 mm, which was etched to remove surface copper foil and leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer. Under a 10 GHz frequency, for a copper-clad laminate with a Df value of less than 0.005, a difference in peeling strength of greater than 0.1 lb/in represents a significant difference.

4. Interlayer Bonding Strength (B/S)

The copper-clad laminate (obtained by laminating five prepregs) was cut into a rectangular specimen with a width of 12.7 mm and a length of greater than 60 mm and tested by using a tensile strength tester by reference to IPC-TM-650 2.4.8. With the proviso that the surface copper foil was not etched off and the measurement position was set at the interface between the second prepreg layer and the third prepreg layer, at room temperature (about 25° C.), the cured insulation laminate was tested to measure the force (lb/in) required to separate the two layers. Under a 10 GHz frequency, for a copper-clad laminate with a Df value of less than 0.005, a difference in interlayer bonding strength of greater than 0.1 lb/in represents a significant difference.

5. Thermal Resistance after Moisture Absorption (PCT)

The copper-free laminate specimen (obtained by laminating five prepregs) was subject to pressure cooking test (PCT) by reference to IPC-TM-650 2.6.16.1 and 5 hours of moisture absorption (test temperature 121° C., relative humidity 100%), and then by reference to IPC-TM-650 2.4.23, the copper-free laminate specimen after moisture absorption was immersed into a 288° C. solder bath for 20 seconds, removed and inspected for the presence of delamination or blistering, which represents "fail", such as whether interlayer delamination or blistering occurs between insulation layers. Interlayer delamination or blistering may occur between any layers of the laminate.

6. Resin Flow of Prepreg During Lamination (Resin Flow)

During the preparation of the copper-clad laminate (obtained by laminating five prepregs), a copper foil, five prepregs and a copper foil were superimposed in such order and then subject to a vacuum condition for lamination at 195° C. for 2 hours to form each copper-clad laminate sample, which was then subject to etching process to remove the copper foils on both sides to obtain the copper-free laminate. Resin flow at edge of the copper-free laminate was examined with naked eyes, wherein the cured portion of resin flow beyond the edge of the prepreg was measured by a ruler for the vertical distance (mm) from the edge of the prepreg. The presence of weave exposure of 1×1 cm$^2$ on the surface of copper-free laminate is determined as dry board. As understood by a skilled person in this field, dry board means that the laminate is not suitable for subsequent processes for making a multi-layer board or a circuit board.

7. Branch-Like Pattern Formation at Laminate Edge after Lamination (Branch-Like Pattern)

Figure 4:
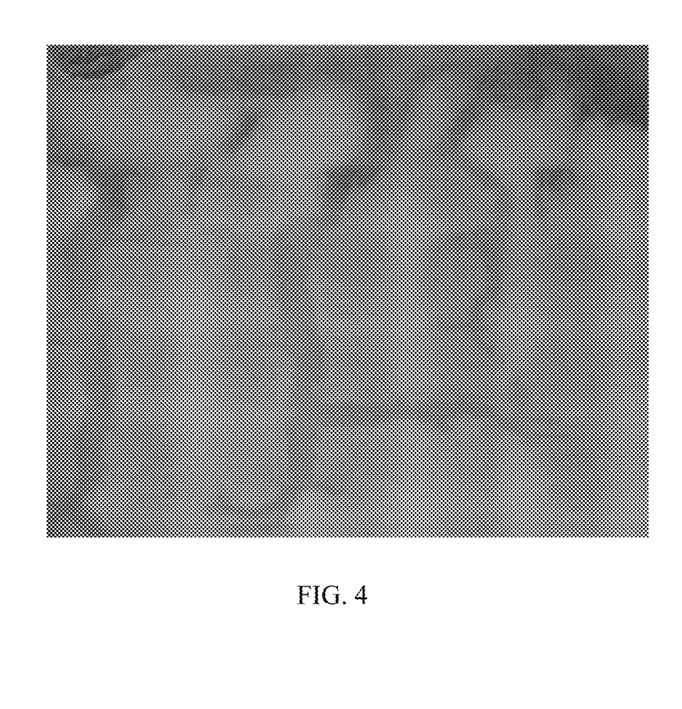
FIG. 4 illustrates a copper-free laminate having branch-like pattern.
Figure 5:
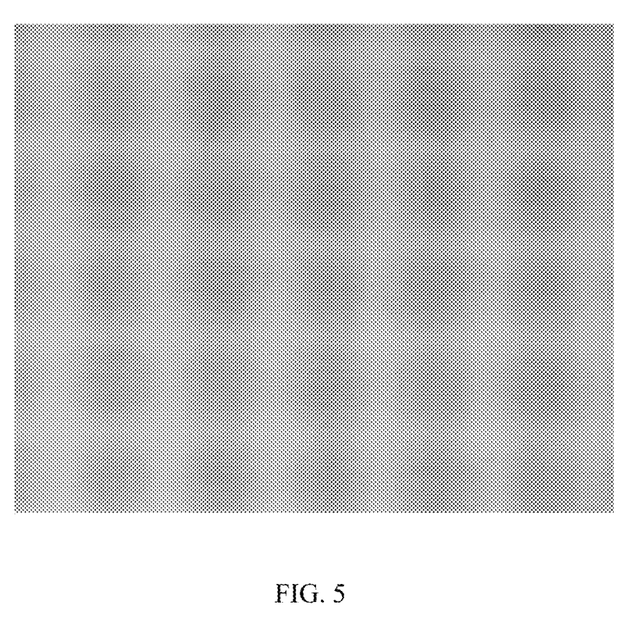
FIG. 5 illustrates a copper-free laminate not having branch-like pattern.

During the preparation of the copper-clad laminate (obtained by laminating five prepregs), a copper foil, five prepregs and a copper foil were superimposed in such order and then subject to a vacuum condition for lamination at 195° C. for 2 hours to form each copper-clad laminate sample, which was then subject to etching process to remove the copper foils on both sides to obtain the copper-free laminate. The surface of the insulation layer of the copper-free laminate was examined with naked eyes to determine whether branch-like pattern was formed at the edge, which represents poor compatibility of the resin composition or high flowability variation that causes inhomogeneity. Presence of branch-like pattern will cause several drawbacks including inconsistent properties (poor reliability) of circuit boards made therefrom and significantly lowered yield, such as poor dielectric properties, low thermal resistance, inconsistent thermal expansion or poor interlayer adhesion. FIG. 4 illustrates a copper-free laminate having branch-like pattern, and FIG. 5 illustrates a copper-free laminate not having branch-like pattern.

TABLE 1

| | E1 | E2 | E3 | E4 | E5 | E6 | E7 | E8 |
|---|---|---|---|---|---|---|---|---|
| Composition | | | | | | | | |
| H1 | 100 | 100 | 100 | 100 | 100 | 100 | 70 | |
| H2 | | | | | | | 30 | |
| H3 | | | | | | | | |
| G-2 | 30 | 60 | 15 | | | 75 | 30 | |
| G-1 | | | | 30 | | | | |
| A | | | | | 30 | | | |
| F-1 | | | | | | | | 130 |
| G-3 | | | | | | | | |
| G-4 | | | | | | | | |
| H4 | | | | | | | | |
| H5 | | | | | | | | |
| H6 | | | | | | | | |
| H8 | 0.2 | 0.2 | 0.2 | 0.2 | 0.2 | 0.2 | 0.2 | 0.2 |
| H9 | 50 | 50 | 50 | 50 | 50 | 50 | 50 | 50 |
| H10 | 100 | 100 | 100 | 100 | 100 | 100 | 100 | 100 |
| Property | | | | | | | | |
| Tg | 227 | 235 | 220 | 222 | 218 | 239 | 228 | 230 |
| Df | 0.0042 | 0.0042 | 0.0043 | 0.0043 | 0.0042 | 0.0042 | 0.0043 | 0.0043 |
| P/S | 4.3 | 3.9 | 4.2 | 4.2 | 4.2 | 3.7 | 4.0 | 4.0 |
| B/S | 3.5 | 3.2 | 3.4 | 3.3 | 3.3 | 3.2 | 3.2 | 3.1 |
| PCT | pass | pass | pass | pass | pass | fail | pass | pass |
| Resin flow | 3~5 | 2~3 | 3~5 | 3~5 | 3~6 | 2~3 | 2~3 | 1~2 |
| Branch-like pattern | no | no | no | no | no | no | no | no |

TABLE 2

|  | E9 | E10 | C1 | C2 | C3 | C4 | C5 | C6 |
|---|---|---|---|---|---|---|---|---|
| Composition | | | | | | | | |
| H1 | 25 | | 100 | 100 | 100 | 100 | 100 | |
| H2 | 75 | | | | | | | 100 |
| H3 | | 100 | | | | | | |
| G-2 | 24 | 30 | | | | | | |
| G-1 | 3 | | | | | | | |
| A | 3 | | | | | | | |
| F-1 | | | | | | | | |
| G-3 | | | 30 | | | | | |
| G-4 | | | | 30 | | | | |
| H4 | | | | | 20 | 20 | | 20 |
| H5 | | | | | 10 | | | 10 |
| H6 | | | | | | 10 | | |
| H8 | 0.2 | 0.2 | 0.2 | 0.2 | 0.2 | 0.2 | 0.2 | 0.2 |
| H9 | 20 | 50 | 50 | 50 | 50 | 50 | 50 | 50 |
| H10 | 100 | 100 | 100 | 100 | 100 | 100 | 100 | 100 |
| Property | | | | | | | | |
| Tg | 236 | 227 | 220 | 225 | 227 | 228 | 186 | 229 |
| Df | 0.0042 | 0.0042 | 0.0045 | 0.0042 | 0.0047 | 0.0046 | 0.0058 | 0.0046 |
| P/S | 4.5 | 3.1 | 3.2 | 3.5 | 3.8 | 3.5 | 3.9 | 3.9 |
| B/S | 3.5 | 2.4 | 2.8 | 3.0 | 3.2 | 3.2 | 3.2 | 2.4 |
| PCT | pass | fail | pass | pass | pass | pass | pass | pass |
| Resin flow | 2~3 | 0 (dry board) | <1 | 3~5 | 3~5 | 2~3 | 3~5 | <1 |
| Branch-like pattern | no | no | yes | yes | yes | yes | no | yes |

The following observations can be made from the results in Table 1 and Table 2.

Compared with C3 (not containing prepolymerized resin but using individual polybutadiene with a 1,2-vinyl content of 85% or above and a number average molecular weight of less than 2000 and bis(vinylphenyl)ethane) and compared with C4 (not containing prepolymerized resin but using individual polybutadiene with a 1,2-vinyl content of 70% and a number average molecular weight of about 3900 and bis(vinylphenyl)ethane), E1 (containing prepolymerized resin) demonstrates better dissipation factor, better peeling strength and better interlayer bonding strength and does not form branch-like pattern.

Compared with C1 (containing prepolymerized resin of polybutadiene with a 1,2-vinyl content of 70% and a number average molecular weight of about 3900 and bis(vinylphenyl)ethane) and C2 (containing prepolymerized resin of butadiene styrene copolymer with a 1,2-vinyl content of 70% and a number average molecular weight of about 4500 and bis(vinylphenyl)ethane), E1 demonstrates better peeling strength and better interlayer bonding strength and does not form branch-like pattern.

Compared with C5 (containing only vinyl-containing polyphenylene ether and no other resin), C3 and C4 have higher glass transition temperature and improved dissipation factor, but the edge of laminate obtained therefrom forms branch-like pattern.

Compared with C6 (not containing prepolymerized resin but using individual polybutadiene with a 1,2-vinyl content of 85% or above and a number average molecular weight of less than 2000, bis(vinylphenyl)ethane and vinyl-containing polyphenylene ether), E8 (containing prepolymerized resin of polybutadiene with a 1,2-vinyl content of 85% or above and a number average molecular weight of less than 2000, bis(vinylphenyl)ethane and vinyl-containing polyphenylene ether) demonstrates better dissipation factor and better interlayer bonding strength and does not form branch-like pattern.

The above detailed description is merely illustrative in nature and is not intended to limit the embodiments of the subject matter or the application and uses of such embodiments. As used herein, the term "exemplary" or "example" means "serving as an example, instance, or illustration." Any implementation described herein as exemplary is not necessarily to be construed as preferred or advantageous over other implementations, unless otherwise specified.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, the scope defined by the claims includes known equivalents and foreseeable equivalents at the time of filing this patent application.

What is claimed is:

1. A prepolymerized resin prepared by subjecting a composition to a pre-reaction in the presence of a polymerization inhibitor, the composition at least comprising bis(vinylphenyl)ethane, polybutadiene and vinyl-containing polyphenylene ether, wherein the polybutadiene has a 1,2-vinyl content of 85% or above and a number average molecular weight of less than 2000, wherein the pre-reaction has a conversion rate of between 30% and 90%, and wherein, during the pre-reaction, components in the composition are partially crosslinked to leave residual vinyl groups;
   wherein the bis(vinylphenyl)ethane and the polybutadiene are pre-reacted at a molar ratio of 2:1 to 1:2;
   wherein the polymerization inhibitor comprises hydroquinone or 2,2'-methylenebis(4-ethyl-6-t-butylphenol); and wherein the polymerization inhibitor is 0.001 to 0.1 mole relative to a total of 1 mole of the bis(vinylphenyl) ethane and the polybutadiene.

2. The prepolymerized resin of claim 1, which has a number average molecular weight of between 4,000 and 12,000.

* * * * *